United States Patent

Black et al.

[11] Patent Number: 5,878,056
[45] Date of Patent: Mar. 2, 1999

[54] MESSAGE TRANSFER IN A COMMUNICATION NETWORK

[75] Inventors: George Black; Peter Johnson, both of Winchester, United Kingdom

[73] Assignee: International Business Machines Corporation, Armonk, N.Y.

[21] Appl. No.: 822,974

[22] Filed: Mar. 21, 1997

[30] Foreign Application Priority Data

Mar. 23, 1996 [GB] United Kingdom .................. 9606183

[51] Int. Cl.[6] ....................................................... H04L 1/14
[52] U.S. Cl. ........................ 371/32; 395/200.67; 370/249
[58] Field of Search .................. 371/32, 33; 395/200.67, 395/671, 182.11; 370/245

[56] References Cited

U.S. PATENT DOCUMENTS 5,710,889  1/1998  Clark et al. .............................. 345/344
5,754,531  5/1998  Okamoto ................................. 370/249

Primary Examiner—Glenn A. Auve
Attorney, Agent, or Firm—Jeanine S. Ray-Yarletts

[57] ABSTRACT

Provided are methods and systems for message transfer between nodes of a communication network which reduce the occurrence of repeated transfer failures associated with a particular message or messages within a batch. When a batch of messages sent from a sender node cannot be stored at a receiver node, the receiver node identifies which messages within the batch caused the rejection and communicates this information to the sender node. The sender node records the destinations of the identified messages in a "destination black list", and then separates messages having these identified problematic destinations from the other messages. The batch of messages is then retransmitted to the receiver, but with the messages which have the identified problematic destinations excluded from the batch. These excluded messages are then dealt with separately without causing repeated rejection of the batch.

14 Claims, 6 Drawing Sheets

MESSAGE TRANSFER IN A COMMUNICATION NETWORK

FIELD OF THE INVENTION

The present invention relates to message transfer between nodes of a communications network, and to methods and systems for dealing with message transfer failures.

BACKGROUND

Processes located at nodes of a communications network frequently need to be able to send messages to and receive messages from other processes at different nodes. It is important for the efficiency of some of these data communications to be able to transfer messages in a batch of several messages. Such batching of messages speeds message throughput and can reduce network communication traffic by limiting control communications (such as sender and receiver location information, confirmations of receipt and commit processing) to one set of communication flows per batch instead of one set per message. In transaction processing systems, committing updates on completion of a transaction involves a relatively high processing overhead, so only committing at the end of a batch of transactional updates can significantly improve system efficiency.

In the context of the present invention the phrases "message transfer" and "messaging" are to be interpreted as including, where the context permits, packet switching and the transfer between network nodes of any data transfer unit, and including the transfer of any application data message, error message, reconfiguration message, or network status message. In a distributed data processing network, the network nodes are data processing resources, e.g. (i) computer systems having computer programs installed thereon, these systems being connected for communication over underlying network links, or, (ii) in networks for which communications management programs are the network entities to which messages are sent, the communication management programs. In a packet switching network, the "nodes" are the switches.

Communication between remote processes within a distributed network may involve multiple intermediate network links and nodes forming a communication path. Messages travelling from one node of the network to an adjacent node may have different ultimate destinations and yet it may be most efficient to transfer several of these messages together as a batch. The sending node can request confirmation that the batch has successfully arrived and been stored at the adjacent receiving node as a final stage of transmission of the batch, such that it is unnecessary to check successful transfer of each message separately.

There are various reasons why it may not be possible to successfully store one or more of the messages of a batch at the receiving node. For example, the destination address may not be recognized (perhaps the named destination does not exist), or there may be a problem with the message storage facilities of the receiving node. For example, the storage facility may already be full or the system may have been set so as not to allow messages to be added to storage.

It is a general requirement of data processing systems to ensure that critical data communications (e.g. messages which affect critical data, such as a funds transfer in a banking system) are successfully completed once and once only. Thus, facilities are required for recovering from failures, whether these be failures of the data processing systems, their connecting communication links, or application detected errors. In a messaging system that uses batching, the implementation of this requirement may involve ensuring that if not all of the batch of messages transmitted from a first node can be successfully stored at the next adjacent node, then the whole batch is backed out. That is, either the whole batch is successfully transferred and stored at a receiver node or no messages within the batch are stored at the receiver node and all of the messages are retained in storage at the sender node. Transfer of a backed out batch of messages can subsequently be retried.

A problem with this all-or-nothing approach to batch transfer of messages is that repeated backouts of a batch will impact message transfer performance. A large batch of messages may repeatedly fail to be transferred because of a recurring problem which is associated with only one message in the batch.

One solution to this problem which avoids repeatedly backing out the entire batch is to store problem messages on a "dead-letter queue" at the receiver node. Rather than simply discarding problem messages (which is unacceptable in systems where messages must not be lost), a dead letter queue is provided as a storage facility of the receiver system into which undeliverable messages are placed. Use of a dead letter queue makes the problem visible and enables fault correction processes to be used, or the messages to be redirected, or messages communicating the occurrence of the message delivery problems to be sent back to the origin of the message.

Clearly, some means of processing the dead-letter queue is required. Secondly, it may not be possible to store all problem messages on a dead-letter queue. There may be no dead-letter queue defined, or if defined it may be full or there may be access problems. In such cases, it is again necessary to reject the entire batch to preserve once-and-once-only delivery semantics. That is, all messages within the batch that have been transferred to storage on the receiving node are backed out. The consequence of this is that all messages which need to be transferred to this next node (whether or not it is their final destination) are delayed, including the messages which could have been successfully stored on this next node. Such message transfer delays can be a significant problem if the reason for the delay persists.

Furthermore, it may be a requirement of the system that messages with the same ultimate destination are never sent out of order. In such cases, use of a dead-letter queue is unacceptable unless there is provided means to correct the ordering before the messages are finally delivered.

SUMMARY OF INVENTION

According to a first aspect of the present invention there is provided a method of message transfer between nodes of a communication network wherein messages transferred within a batch from a sender node to a receiver node are either all stored at the receiver node or the whole batch transfer is rejected with none of the messages of the batch being stored at the receiver node, the method including:

responsive to rejection of a batch transfer due to a failure to store one or more messages of the batch at the receiver node, identifying which message or messages within the batch caused the rejection; and retrying transfer of a batch of messages with said identified messages excluded from the retried batch.

The invention enables batch transfer to be retried after a transfer failure, with an expectation that rejection-causing conditions associated with a particular identified message or messages will not result in recurring failure of the batch. Use of the invention can thus permit a batch transfer to proceed after an initial failure, even if the failure was caused by a persistent problem.

The invention also reduces reliance on the availability of dead letter queues at receiver nodes, and by facilitating reduced use of dead letter queues makes it easier to maintain message ordering.

The invention has the additional advantage that, if message traffic is overloading one node such that message storage facilities (e.g. one or more message queues) are becoming full and some messages sent to the node cannot be successfully stored there, the messages which cannot be stored are retained on adjacent sender nodes rather than on the node which is having the problem, thus providing a pacing effect. The messages which fail (or certain selected messages which fail—see below) are backed out onto the sender node for retry rather than responding to an initial failure by placing all messages which fail into a dead letter queue at the receiver node.

Preferably, methods according to the invention include the step of transferring the identified problematic messages into a particular storage facility at the sender node (such as a defined retry message queue having an associated process for transferring problem messages to that queue) such that they are separated from the rest of the batch but are not discarded. Transfer of the batch (excluding the problem messages) can be retried after the separation, with or without further examination of the messages which are not excluded, with increased likelihood of success following the separation. The identified rejection-causing messages can subsequently be retrieved from the problem-message storage facility for retransmission, without impacting the success of transfer of the batch. Since some of the conditions which mean that messages cannot be successfully stored at the receiver node may be transient, the messages which were excluded from the resent batch are preferably retrieved from the problem-message storage facility periodically (e.g. after expiry of a timer or otherwise as determined by administration-defined parameters) to attempt retransfer.

Some provision for continued processing of problem messages is important where reliable once-only transmission of each message is a system requirement. Alternatively, for certain systems or certain types of message (e.g. a status query) it may be sufficient to communicate to the original sender of a message the information that a particular transfer of the message between two nodes has failed without retrying. Merely discarding the identified messages will be unacceptable to many applications, such as a funds transfer application within a banking system for example.

Methods according to the invention preferably include the steps of identifying and recording the destinations of said identified problem messages, and the retransmitting step involves retransmitting the batch excluding the identified problematic messages and excluding any other messages having the same (recorded) destinations. This aspect of the invention relates to methods of message transfer in which messages transferred within a single batch from a sender node to a receiver node can have different ultimate destinations. Thus, if the rejection of the batch was caused by problems associated with the destination of a particular message, other messages which would be rejected for the same reason are identified and excluded from the retransmitted batch. This exclusion of messages with identified problematic destinations will increase the likelihood of the resend being successful and so will, in many cases, avoid further back outs. This is particularly useful where the condition which caused the transfer failure is that a destination message queue at the receiver node is full or is otherwise unable to accept the addition of messages, since these are conditions which can be expected to result in transfer failure for any message sent to that queue. "Destination" in this context is preferably the final destination of the message, but alternative embodiments of the invention may distinguish between messages having different next-step destinations as will be explained below.

A first preferred embodiment of the invention includes the step of the receiver node communicating to the sender node an identification of each of the messages within the batch which could not be successfully stored at the receiver. In a second alternative embodiment of the invention, the receiver node reports back to the sender only those transfer errors which it identifies as being transient. According to this second embodiment, transfer errors which are permanent (e.g. specified destination address is invalid) can be dealt with by the messages in question being transferred to a dead-letter queue at the receiver since there is nothing to be gained by retrying transfer of these messages.

The exclusion of all messages having the same destinations as messages for which problems have been identified is preferably implemented as follows. On backout of a batch by a receiver node, all messages within the batch are also backed out at the sender node, and the messages which could not be stored are identified to the sender node. The sender node records the destinations of identified problem messages in a "message black list" of destinations. The identified messages are then removed from the first storage facility and transferred to a special storage facility defined for problem messages. The sender node now takes the remaining messages one by one from the first storage facility to include in a new batch for transfer to the receiver node, and at the same time compares the destination of each message with the destinations in the message black list. Any messages having these destinations are transferred to the special storage facility at the sender node instead of being included in the batch which is transmitted to the receiver node.

In accordance with a preferred embodiment which implements such exclusion there is provided a method of batched message transfer between nodes of a communication network wherein messages transferred within a batch from a sender node to a receiver node can have different ultimate destinations, and wherein either all messages within the batch are stored at the receiver node or the whole batch transfer is rejected and retained in storage at the sender node without being stored at the receiver node, the method including:

(a) recording at the sender node the destinations of all messages to be transferred within a batch;

(b) initiating transfer of the batch to the receiver node;

(c) responsive to rejection of a batch following failure to store one or more of the messages of the batch at the receiver node, identifying at the receiver node which message or messages within the batch caused the rejection;

(d) backing out the message transfer operation at the receiver node and communicating to the sender node an identification of said rejection-causing messages;

(e) backing out the message transfer operation at the sender node;

(f) recording at the sender node the destinations of said identified messages;

(g) transferring said identified messages and other messages having said recorded destinations into a problem-message storage facility at the sender node;

(h) retransmitting the batch of messages excluding said messages transferred to the problem-message storage facility; and (i) retransmitting to the receiver node said messages from the problem-message storage facility separately from retransmission of said batch.

Steps (c) to (h) can then be repeated until the batch is successfully stored at the receiver node, and step (i) can be repeated until either all messages from the problem-message storage facility are successfully stored at the receiver node or a maximum retry count has been reached. Such repeats may not be performed consecutively, as it may be desirable to intersperse retries from the problem-message storage facility with a number of other batch transfers.

Methods of batch transfer according to the invention preferably involve an attempt being made to store at the receiver node each of the messages within the batch, such that a decision of whether it is necessary to back out the batch is only taken at the end of the batch transmission. If the decision is made at the end of the batch to backout, then the receiver node will notify the sender node which messages it was unable to deal with. An alternative which is also within the scope of the present invention is to backout the batch as soon as a failure to store one of the messages within the batch occurs (i.e. to detect and respond to failures as soon as they are identifiable, without having attempted to store all messages within the batch and so without necessarily having identified all problematic messages).

In cases where the retransmitted (modified) batch includes messages which still cause rejection, the steps of identifying messages which cause rejection of the batch transfer, recording their destinations, and retransmitting the modified batch which excludes messages having those destinations are preferably repeated until a batch of messages is successfully stored at the receiver. Repeated rejections may occur if the method rolls back the batch as soon as the first problem of message storage at the receiver node is identified and before an attempt is made to store all messages of the batch. It may also occur if a new transient problem occurs (e.g. if a queue on the receiver node in which a message must be put is now full), or if the retransmitted batch includes a new message or messages which were not part of the batch as initially sent.

The latter example may occur in systems in which resending of a modified batch entails transmitting all messages (up to a maximum size or number) held within a particular storage facility which are not identified for exclusion from that batch, including messages placed in storage since the initial unsuccessful transfer attempt. Thus, the sender system distinguishes between apparently problem-free destinations and destinations with identified problems and then controls the selection of messages for the next batch so as to exclude messages having the problem destinations but to include any messages having the apparently problem-free destinations regardless of whether they were part of the original batch or not.

This preferred feature of the invention may be implemented so as to exclude from the new batch any messages which have destinations other than those already recorded as being destinations of messages within the original batch. This would enable the new batch to include some messages which were not within the original batch, but only if the initial batch transfer attempt has already confirmed that there are no problems associated with the particular destinations of those new messages. An alternative which is also within the scope of the invention is to set up the system to restrict the modified batch to include only messages which were part of the original batch. Either of these two alternatives will increase the likelihood that transmission of a new batch following an initial failure will be successful.

In a preferred embodiment of the invention, storing of all of the messages of a batch at the receiver node comprises a message receiver process at the receiver node storing messages of the received batch in message queues at the receiver node for subsequent retrieval either for processing or onward transmission. The batch transfer is rejected only if not all of the messages within the batch can be stored in the message queues of the receiver node. In such a message queuing system, the destination message queues at the receiver node can include local message queues which are serviced by locally stored application programs and "transmission queues" for messages which are to be transmitted to another node for processing by a remote application. Such a system is described in more detail below in relation to a preferred embodiment of the invention.

According to a second aspect of the invention there is provided a message communication system having message storage means and having computer program means for supporting message transfer to and from nodes of a communications network of which said system is a first node. The system supports batched transfer of messages wherein messages sent within a batch from the first node to a receiver node may have different ultimate destinations, and wherein either all messages within the batch are stored at the receiver node or the batch transfer operation is rejected and backed out without any messages of the batch being stored at the receiver node. The system includes means, responsive to a communication from the receiver node indicating that a batch transfer is rejected and identifying which messages within the batch caused the rejection, for excluding said identified messages from a batch of messages to be transferred.

The system also includes means for identifying which message or messages within a batch of messages received by that system could not be stored at that system and so caused rejection of the batch transfer.

A system according to the invention preferably includes means for recording the destinations of the identified problematic messages and the means for excluding is adapted to ensure exclusion of all messages having these recorded destinations from the batch which is retransmitted after a rejection.

According to a third aspect of the invention, there is provided a communications network including a plurality of network nodes and communications links, each of said network nodes having associated therewith:

data storage means; and program means for supporting batched message transfer between nodes of the communication network wherein messages transferred from a sender node to a receiver node can have different ultimate destinations, and wherein either all messages within a batch are stored at the receiver node or the whole batch transfer is rejected without any messages of the batch being stored at the receiver node. The computer program means includes:

means for identifying which message or messages within a batch received at that node has resulted in a rejection of a batch; and means responsive to identification of the message or messages which caused rejection of a batch sent from that node for excluding said identified messages from a batch of messages prior to retrying transfer of the batch.

According to a fourth aspect of the invention, there is provided a computer program recorded on a recording medium, for supporting batch message transfer between nodes of a communication network. The program includes means for identifying which messages within a received batch are responsible for a batch transfer being rejected and for communicating that information to a sender node, and means for controlling retransmission of a batch which was sent from that node and rejected so that the retransmitted batch excludes messages identified as having caused the rejection.

BRIEF DESCRIPTION OF DRAWINGS

The invention will now be described in more detail with reference to the accompanying drawings in which.

DETAILED DESCRIPTION

A preferred embodiment of the invention includes a method and apparatus for message transfer between network nodes, wherein messages are transferred in batches and, if the batch transfer fails, the messages within the batch which caused the failure are identified and then the batch is resent without those problem messages. In the following description of a preferred embodiment, the word "node" refers to the communications management programs which are the network entities to which messages are sent.

The present invention may be implemented within many different data processing systems and communications systems which are able to use batch transfer methods. The invention may be implemented in a computer program product which is adapted for use with any computer. For example, suitable data processing systems in which the invention may be used are IBM's RISC System/6000 computers, which run IBM's AIX operating system, and IBM's PS/2 personal computers, which run IBM's OS/2 operating systems. According to the preferred embodiment, the invention is implemented in a message-oriented middleware (computer program) product such as a product within IBM's MQSeries family of commercial messaging software products. The products within the MQSeries product family are each adapted to run on a specific one of a large number of different hardware and operating system platforms. Any one of these MQSeries products may implement the invention.

(IBM, MQSeries, RISC System/6000, PS/2, OS/2 and AIX are trademarks of International Business Machines Corporation.)

Figure 1:
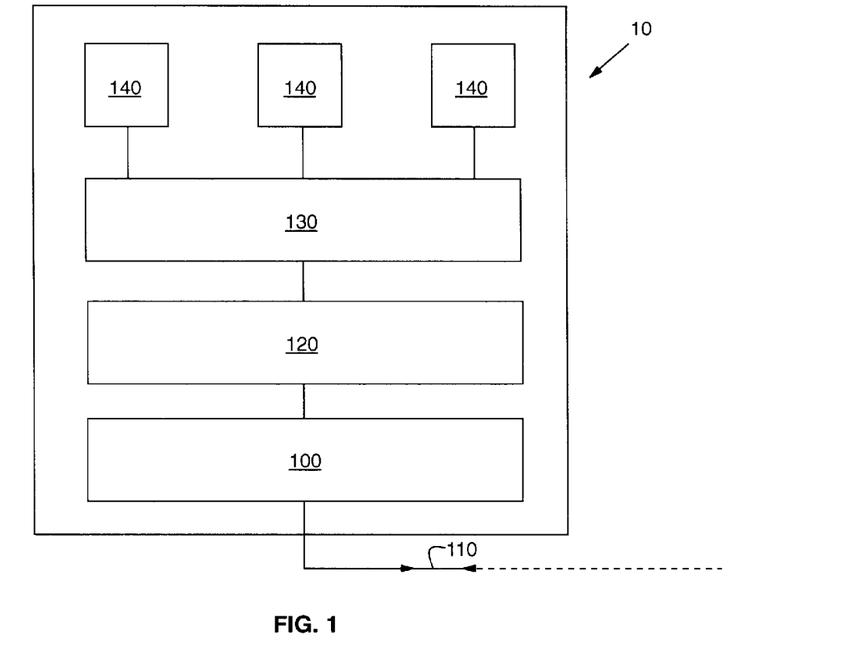
FIG. 1 is a schematic representation of the hierarchy of components of a data processing system in which the invention may be implemented.

FIG. 1 is a simplified schematic representation of the hierarchy of data processing system resources of a system in which the invention may be implemented, demonstrating the hierarchical position of the message oriented middleware on top of the operating system (using the operating system resources) and underlying the application programs. The Figure shows a system 10, comprising hardware 100 having network communication links 110 thereto and having operating system software 120 installed thereon, such as may be provided in any general computer. The system in which the invention is implemented also has communication-supporting (messaging) software 130 interfacing with the system's operating system. The messaging software provides support for a number of application programs 140, which are the business applications run by a system user (e.g. an airline passenger booking facility run by a travel agency).

It will be helpful to set out some basic concepts of messaging and queuing. Messaging and queuing is a method of inter-program communication which allows programs to send and receive application-specific data without having a direct connection established between them. A message consists of two parts—application data and a message descriptor containing control information. The application data in a message is defined and supplied by the application program which sends the message. There are no constraints on the nature of the data in a message (for example, it could consist of one or more bit strings, character strings, binary integers, etc). Applications view the string of bits and bytes that make up a message as consisting of a sequence of items which each have a particular meaning and data type. In addition to the application data, a message has associated with it some ancillary data. This is information that specifies the properties of the message, and is used by the message queuing service to decide how the message should be processed. Some of this information must be specified by the sending application.

A message queue is a named object in which messages accumulate and from which they are later removed. Each queue belongs to one particular queue manager (which is the system service that provides the message-queuing facilities used by applications), and the queue manager is responsible for the maintenance of that queue. A message queue is not merely a stack: when messages are added to a queue, they are added at the end, and when messages are taken from a queue they are normally removed from the front (although facilities do exist for reading messages in other than FIFO order). The physical representation of a message queue depends on the environment, but can be a buffer or buffers in main storage, a file or files on disk or other permanent storage device, or both of these. The physical management of message queues is entirely the responsibility of a queue manager, and such details are not made apparent to application programs. Applications can view a message queue simply as a "black box" in which messages accumulate. Applications have access to message queues by using message queuing API calls—obtaining message queueing services by using the message queueing calls to communicate with the queue manager that is installed on the same system as the application (i.e. the local queue manager).

Applications communicate by agreeing to use particular named message queues, sending messages to the specific target queues that the application programs have agreed to read from. The locations of these queues need not be apparent to the applications which send the messages; each application interacts only with its local queue manager, and it is the network of interconnected queue managers that is responsible for moving the messages to the intended queues. In this way, the message queuing software greatly simplifies the level of complexity that is required of the application programs, removing the need for them to implement their own complex communications controls.

Message queuing communication between programs, using batch transfer of messages between adjacent network nodes, is provided by the MQSeries family of software products. The MQSeries products and the communications methods implemented in those products are described in the following publications:

"An Introduction to Messaging and Queuing" (IBM document number GC33-0805-00);

"MQSeries—Message Queue Interface Technical Reference" (IBM document number SC33-0850-01); and "Messaging and Queuing Using the MQI", B. Blakeley, H. Harris & R. Lewis, McGraw-Hill, 1995.

Figure 2:
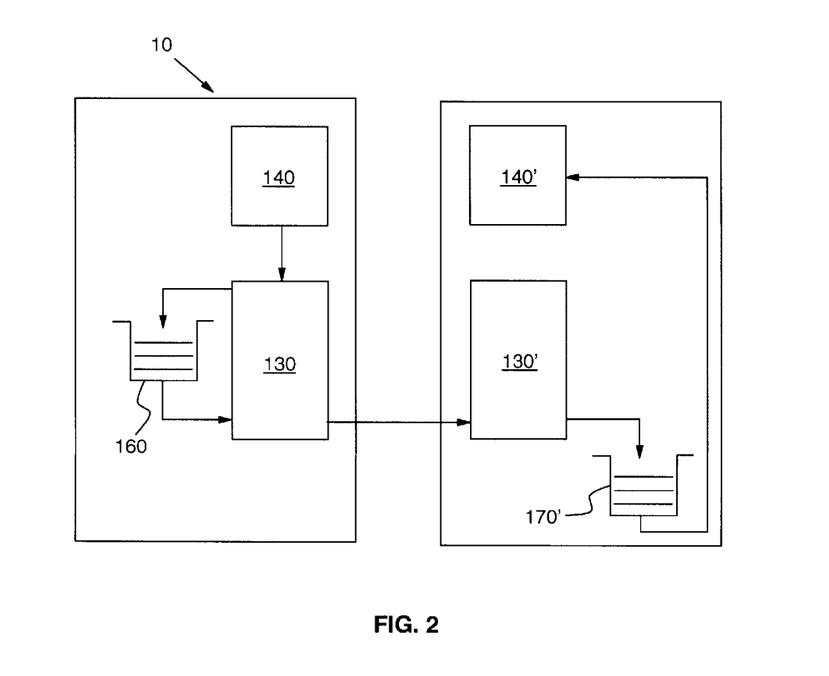
FIG. 2 is a schematic representation of the transfer of a message from a first application to a second application on a different data processing system, using messaging and queuing.

Using the communications support of IBM's MQSeries products, communication between application programs is via message queues, as will be described with reference to FIGS. 2 and 3. A sender application 140 sends data via a message which it places onto a queue in storage, for a receiver application 140' to sequently retrieve when it is ready. Every queue in an MQSeries system belongs to a queue manager (which is the executable program in an MQSeries product), and the queue manager provides access to the queues in response to requests from application programs (or from administration tools). There is no requirement for a logical connection between the application programs themselves and the use of queues controlled by queue managers facilitates asynchronous communication, so each application program can run independently. The queue manager software provides for reliable storage of queued messages, not deleting a message from a sender system until it has been safely stored at the receiver system.

Application programs can put messages onto local queues which are managed by a local queue manager program 130 (and which queues are held in the main memory or disk storage of the local system) and retrieve messages from them. A remote queue 130' is one which belongs to a queue manager other than the one to which the application 140 directly connects. Access to a remote queue involves communication between the local queue manager 130 and the remote queue manager 130'. Applications can place messages on remote queues but cannot read messages from them.

The mechanism by which queue managers arrange to forward messages to remote queue managers are transmission queues 160. When a queue manager receives a request to put a message on a remote queue 170', it actually puts it on a particular transmission queue 160 which is associated with the queue manager 130' which is the target for the request. A transmission queue forms one end of the link between a pair of queue managers. All messages whose immediate destination (i.e. the next step of their transfer across a network) is the same queue manager can be placed in the same transmission queue, regardless of their final destination. Thus, only one transmission queue is generally needed for moving messages in one direction from one queue manager to another, although there can be more than one. Transmission queues containing messages to be sent to queues belonging to remote queue managers enable the movement of messages to remote queues to be carried out in stages between adjacent queue managers. The staging of message transfer is invisible to the application programs involved in the communication.

Figure 3:
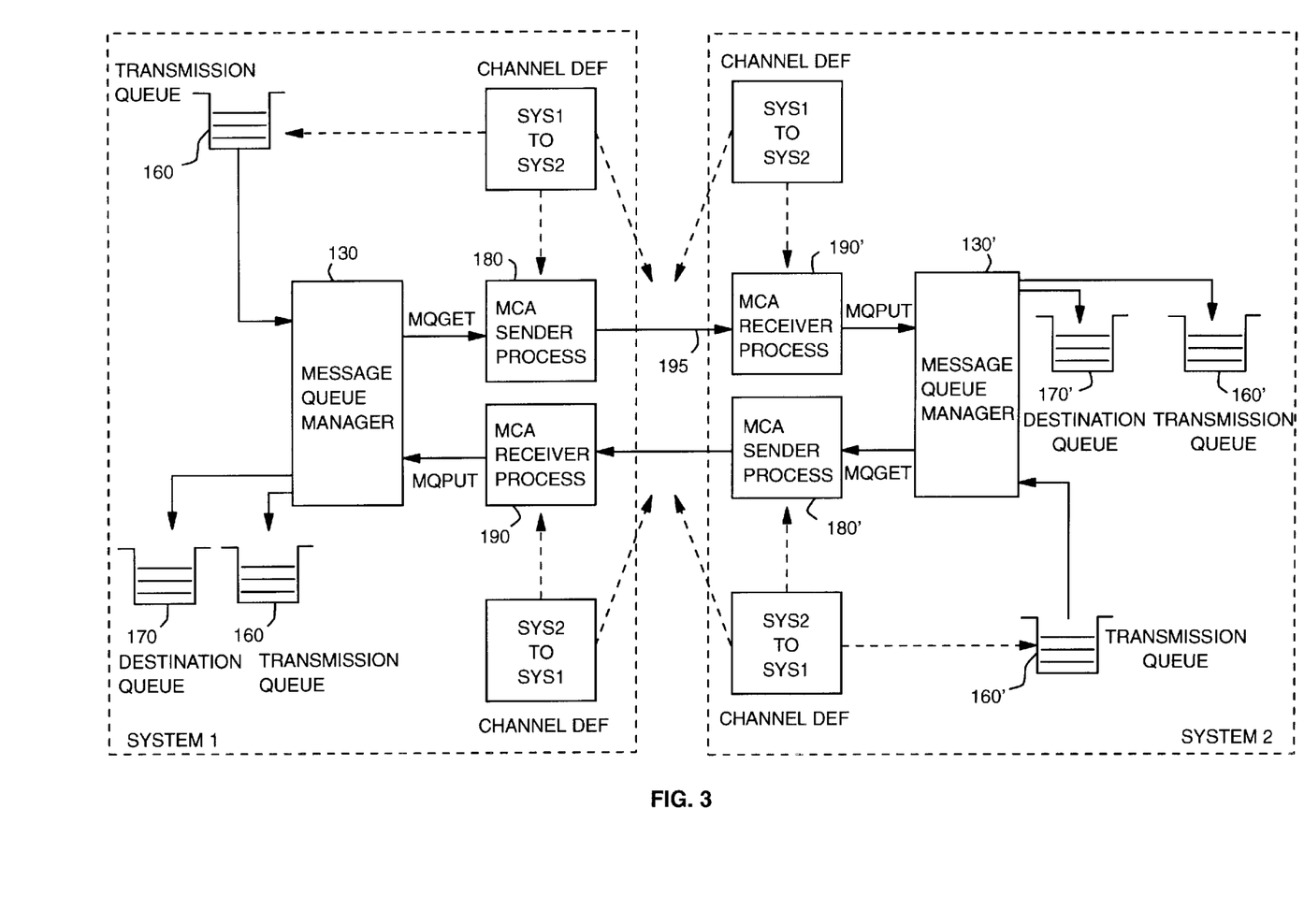
FIG. 3 is a schematic representation of the two adjacent computer systems of FIG. 2 and of the interrelationships between the system entities involved in message communication.

Referring now to FIG. 3, queue managers 130,130' may store messages onto a number of different queues. If the messages are eventually to be processed by local application programs then the queue manager stores them on local destination queues 170; and if the messages are eventually to be processed by a remote application, then the queue manager stores them in the special local queues known as transmission queues 160. There may be a plurality of local destination queues and of transmission queues controlled by a particular queue manager, as will be explained below. The messages on a transmission queue are extended by the queue manager to include a transmission queue header in addition to the application message (the data being transferred by an application). The transmission queue header is an architected descriptor containing the name of the destination queue and the message descriptor. Messages on destination queues include the application data and a message header specifying control information.

The transport relationship between two queue managers is known as a channel. The key elements defining a channel are the name of a transmission queue, information concerning the transport processes or programs 180,190' which send or receive messages over the channel (these processes, which are part of the queue managers, are known as message channel agents—hereafter MCAs), and communications protocol and target system information for the destination to which messages on the transmission queue are to be sent. The association between a particular channel definition and the various data model entities involved in the message communication is represented by broken lines in FIG. 3. Each named channel is defined in both the sending and receiving nodes. The channel name is used in the transmissions between the sender and receiver processes to identify the channel to the receiver or for a receiver to request that messages from a particular channel be sent. Channel definition has some information which is common for all environments and some which depends on the operating system environment and underlying communications protocol to be used.

The communication of messages between queue managers is carried out by MCAs working in pairs across specific channels: one sender 180 and one receiver 190'. A pair of MCA processes uses a transport connection 195 such as a VTAM APPC session or a TCP/IP connection as a transport layer. Message traffic in the opposite direction flows between a sender 180' and a receiver 190 on a different channel, the channels being used effectively as unidirectional pipes between nodes. There are four types of MCAs:

Sender—which takes messages from a transmission queue and sends them to a Receiver or Requester;

Receiver—which receives messages and queues them;

Requester—which sends a single message to cause a Sender or Server to be started remotely;

Server—which is started by a message from a requester, and then becomes a Sender.

An MCA 180 dequeues messages from transmission queues and transmits them over the transport connection 195. The receiving MCA 190' queues the messages to the destination queues 170 named in the message header. These two units of work, dequeue and enqueue, are performed such that any failure at any point in the protocol can be detected and rectified (as described below) so that each message is delivered once and once only. In the case where the destination queue is more than one hop from the original transmission queue, the receiving MCA will queue the message on another transmission queue for the next hop. This provides a safe store and, in the event that the next connection is unavailable, the necessary asynchronism to allow this first stage of transmission to still be carried out. The message format and the safe movement protocol are transport layer independent so that MCAs can support different transport protocols on different channels. The protocols used by the MCAs are described below.

A channel may be started in a number of different ways:
1. a terminal operator may issue a START CHANNEL command;
2. the channel can be triggered, a Sender MCA being started automatically by a queue manager when a message arrives on the transmission queue; or
3. by a network request—the communications transport being configured to automatically start an MCA when a request from the network is received. Receiver, Server and Sender channels could be configured this way.

Before any messages or data can flow down a channel, the two MCAs which are to use it must first negotiate the way in which they are going to communicate. Thus, channel initialization involves negotiation of certain protocol parameters, such as which communication partner is going to do any needed conversion of control and message header data. Two MCAs may be running on systems using two different data formats. For example, one may be using ASCII and the other EBCDIC. One may be encoding numbers left to right, the other right to left. The control information and message header data must be converted from the sender's representation to the receiver's. Data conversion over channels applies only to control information (such as destination queue name, control field lengths, and the like): no application data conversion is performed by MCAs, since MCAs do not need to interact with the application data in a message when they transmit it.

Figure 4:
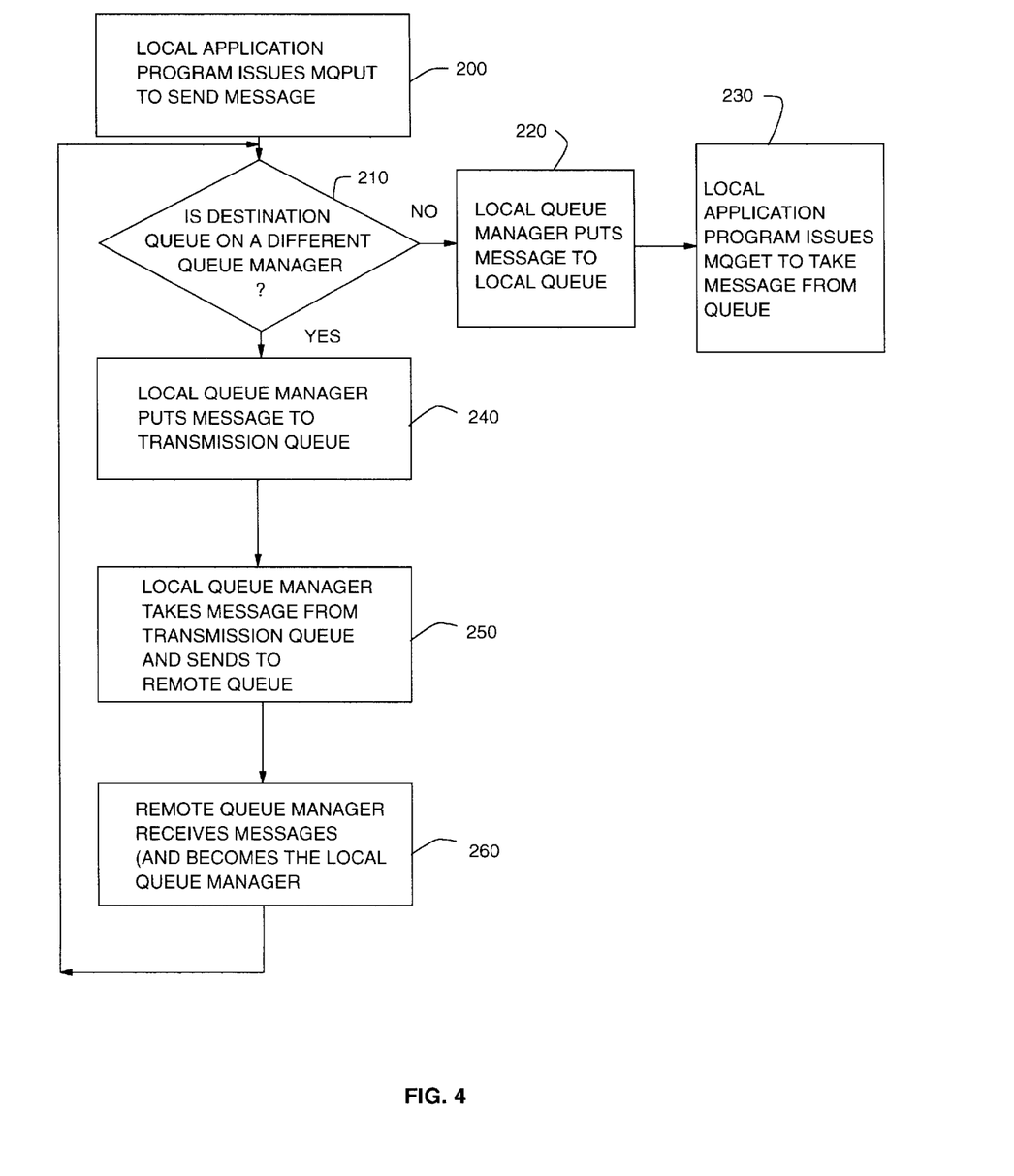
FIG. 4 is an overview flow diagram showing the sequence of steps of message communication between application programs, including successful batch transfer.
Figure 5:
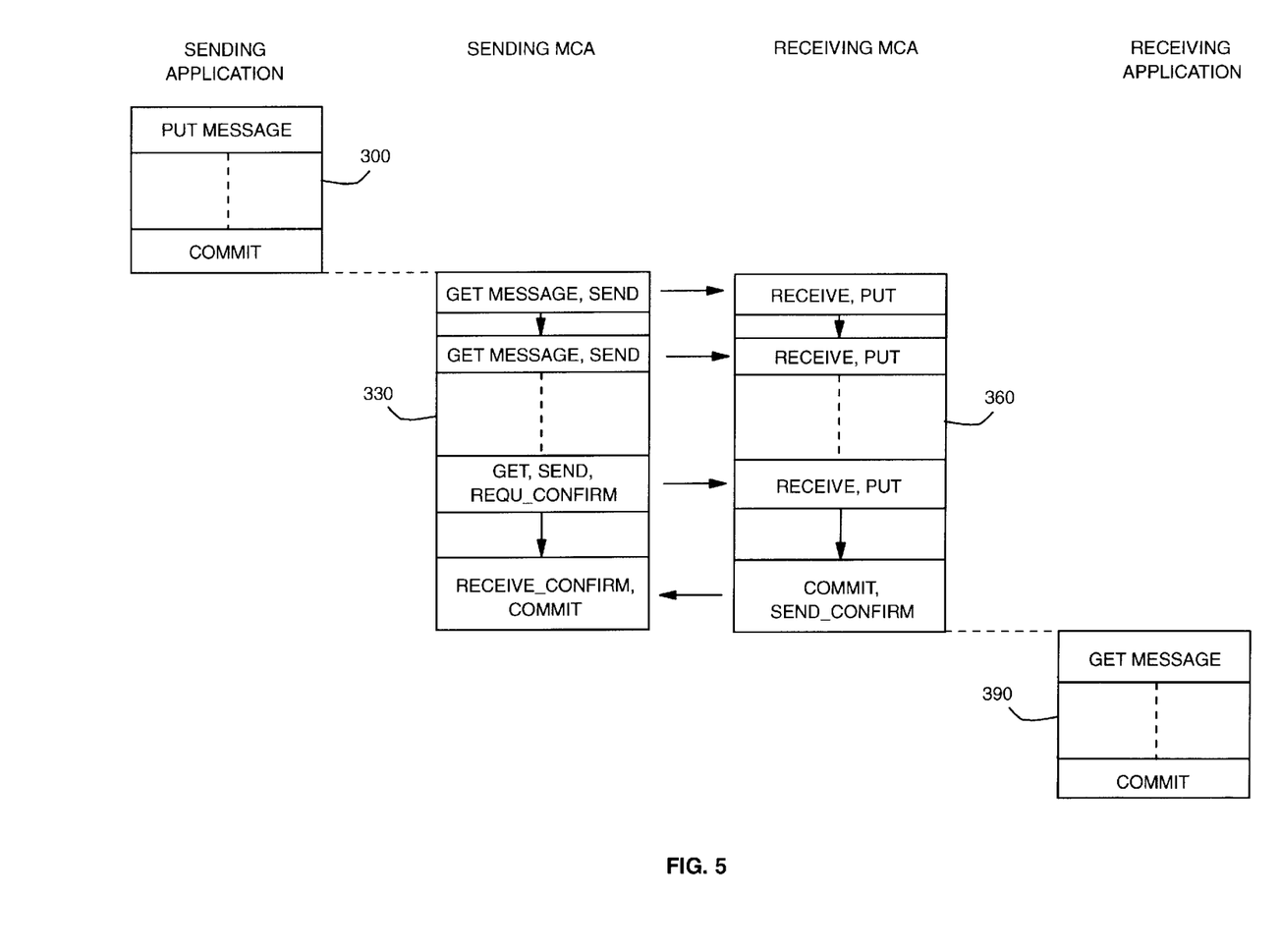
FIG. 5 is a representation of the message flows between processes during normal forward processing of a method of communication between application programs.

The method of delivering messages between applications on different computer systems involves the following steps, described with reference to FIGS. 4 and 5:

An application sends a message to a target destination queue for processing by another application by issuing (200) an MQPUT command. The local queue manager reads the destination queue name specified by the application in the message's header and determines (210) where to put the message. If the destination queue is a local queue then the local queue manager puts (220) the message into that local queue. The unit of work including the operation of putting the message to a queue must be committed before the message is available to other applications. An application serving that local queue can then asynchronously issue MQGET (230) to take the message from the queue for processing. The MQPUT and MQGET operations are within two separate units of work.

If the destination queue is not the responsibility of the local queue manager, then the local queue manager puts the message onto a local transmission queue (240), for transfer to another queue manager. There may be a plurality of transmission queues defined for each queue manager, but a one-to-one correspondence between transmission queues and remote destination queues is not necessary. All messages that are to be passed between two adjacent queue managers (that is, all messages to be sent from a first queue manager which have a common nearest neighbor queue manager in the direction of their respective target destination queue managers) can be put in the same transmission queue. It is equally possible to have a number of transmission queues for traffic going to the same next node. A maximum batch size is specified (for example 50 messages) to limit the number of messages which will have to be resent in the event of a failure during transmission of a batch of messages. The unit of work 300 which puts the message to the transmission queue must be committed before the message is available to other processes.

The local queue manager (or an end user) starts a sender MCA to transmit messages to the next queue manager. The sender MCA then gets messages (250) (issues MQGET) from a transmission queue owned by this queue manager and transmits them as a batch to the next queue manager on the way to the destination queue manager or queue managers. Each message is either transmitted in one transmission or as a plurality of transmission segments in a plurality of transmissions if the messages are too large for the transport connection to send in one package (e.g. a message might be 4 Megabytes in size and the maximum transfer size 32 kilobytes). The steps of getting and transmitting messages is performed within a syncpoint-manager-controlled unit of work 330, which is held in-doubt by the sender at this stage. Log records are written specifying the in-doubt state of the resource updates. The batch has a request for confirmation of receipt of the batch attached to it: this is implemented by the last message (or the last transmission segment of the last message) of the batch having a Request_Confirm control flag set in its transmission segment header.

Each message has a message sequence number associated with it—one of a monotonically increasing sequence of numbers, uniquely assigned to a single application message on a channel. Message sequence numbers are used to resynchronize between sender and receiver in the event of a link failure or program failure. The highest message sequence number in the batch is taken as the logical unit of work identifier (LUWID)—a unique value defining a batch of messages on a channel which are under control of a syncpoint manager.

The receiver MCA receives (260) the messages and the receiver queue manager determines (210) where each message is to be sent (as the sending queue manager program did previously). The receiver queue manager puts the messages (using MQPUT) within a syncpoint-manager-controlled unit of work 360 to queues belonging to the receiving computer system's queue manager, which may be the actual application-specified destination queue for a particular message or may be a related transmission queue for the next hop towards the target system.

Either all of the messages in the batch of messages transferred by MCAs are successfully received and queued by the receiving queue manager or the batch is rejected as a whole and not safe stored at the receiver (the unit of work is rolled back). If the batch is successfully received and queued then the receiver sends an acknowledgement of receipt and storage (a Status segment indicating "No error" is transmitted), having logged the LUWID and committed the batch of messages together as an atomic action. On receipt of the positive acknowledgement the sender also commits the batch of messages using the LUWID, this commit of the MQGET operation deleting the messages from the transmission queue. The next batch can then be started. If no messages are left on the transmission queue (and a preset time interval has expired) or a request to close the channel has been received, then the connection can be terminated.

To complete the assured delivery of messages following successful queuing by the receiving queue manager, the target application which services the destination queue can issue MQGET to get messages from the queue as part of a unit of work 390 under the control of its local syncpoint manager, to allow rollback of the message to the queue in case of application failure or commit of a successfully processed message to delete it.

As noted previously, there are various reasons why it may not be possible to successfully store one or more of the messages of a batch at the receiving node. A communication link or program failure will require rollback of any in-doubt (uncommitted) batch of messages, but for such failures the requirement to return system resources to a consistent state does not necessitate distinguishing between particular messages within the batch (although the system may be set up to ignore certain "non-persistent" messages after such a failure). Other conditions may prevent the successful storage of only certain messages within a batch. Examples in a message queueing environment are that the named target queue for a particular message does not exist or it is already full.

If the batch is rejected, an acknowledgement of rejection (a Status segment indicating Error—which may include details of the error) is transmitted to the sender which then rolls back its in-doubt messages onto the transmission queue ready for retry, and terminates the channel. If a batch of messages is rolled back, the sequence number or LUWID must also be rolled back, to the value of the last successfully committed batch. If no confirmation is received, due to transport or communication-partner failure, then the channel is terminated by the sender and the receiver MCA's unit of work is rolled back. If the sender has not yet sent a confirm request then the sender MCA should also roll back. If it has sent a confirm request then its log records and those of the receiver program must be examined to determine whether it should be committed or rolled back. The MCAs automatically perform the determination of whether the first unit of work should be committed or rolled back (unless contact cannot be reestablished in which case the operator may take the decision).

Figure 6A:
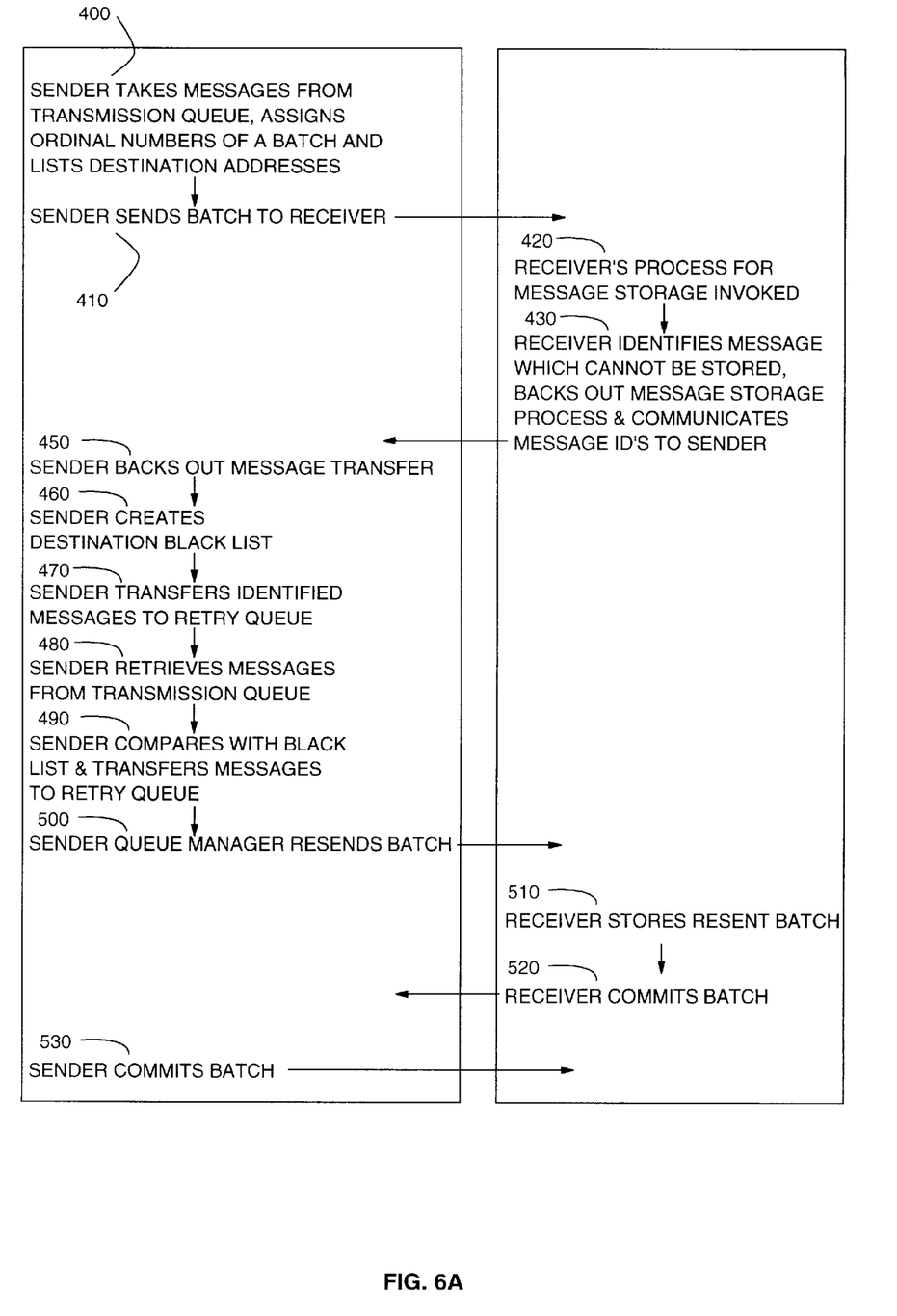
FIGS. 6A and 6B are a flow diagram showing the sequence of steps during batch message transfer according to an embodiment of the invention, in the case where transfer of the batch is rejected on the first attempt.
Figure 6B:
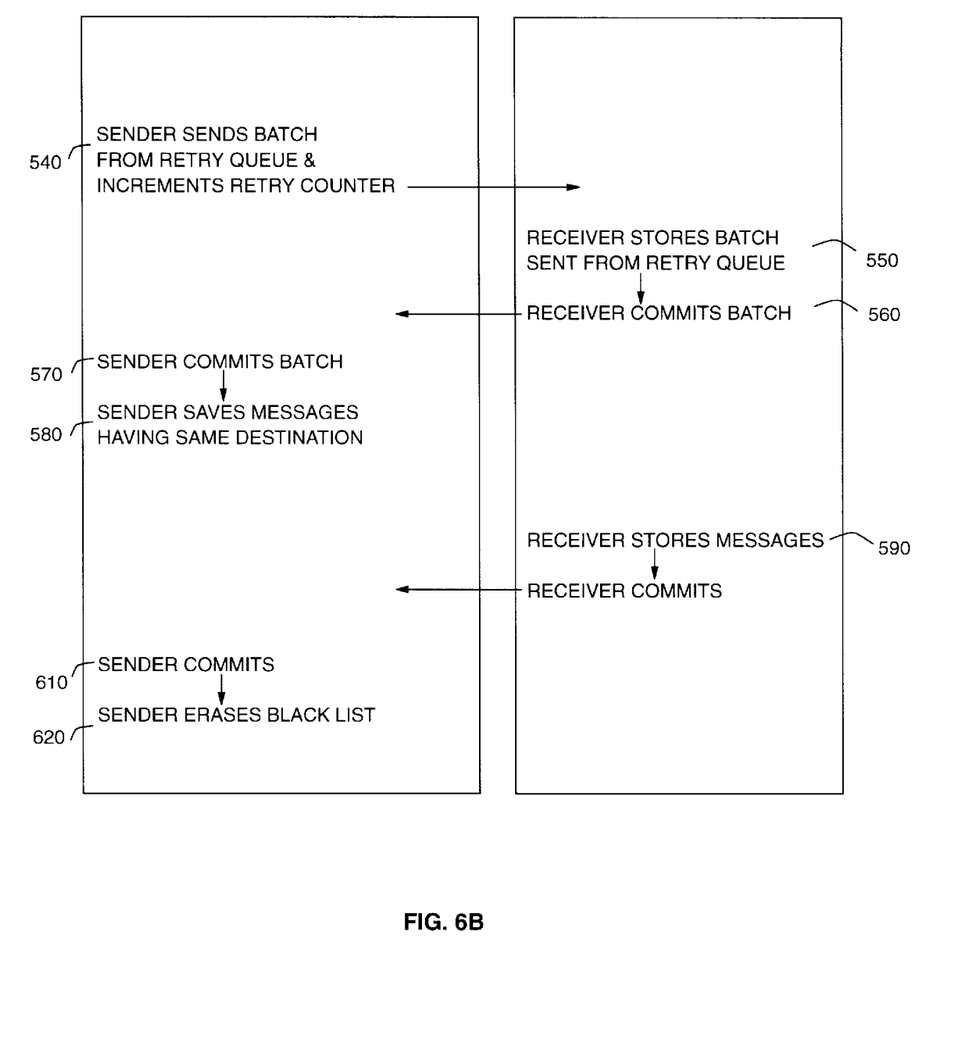

At the end of each batch, if the receiving node has been unable to store any one of the messages within the batch, then the receiver node rejects and backs out the batch as described above. Simply backing out the batch onto the sender node's transmission queue and attempting retry of the batch transfer may result in repeated failure of the batch transfer for the same reason (e.g. if the rejection was caused by a permanent problem such as an invalid message address and possibly also if caused by transient conditions which still exist at the time of the retry). Such transfer problems may be associated with only some of the messages of the batch. To reduce the recurrence of failures associated with specific messages, the following operations are performed (see FIG. 6).

The sender node maintains 400 a record of the final destination addresses (target queue manager and queue name) of each of the messages which it sent within the batch—this information being obtained from the message headers. On failure to store one or more of the messages of the batch at the receiver node, the receiver node queue manager notifies 430 the sender node queue manager which messages it was unable to successfully store by specifying the ordinal numbers of these messages within the batch and backs out the batch. (Of course, any unambiguous message identification may be used as an alternative to ordinal numbers). The sender node uses the information returned to it by the receiver node and its record of message destinations to identify the destinations of all messages which could not be stored. These destinations of rejection-causing messages are recorded 460 in a list at the sender node (referred to as the "destination black list" hereafter).

The sender node also backs out 450 the batch transfer, causing all of the messages in the batch to be reinstated in the transmission queue at the sender node. The sender node then selects the identified numbered messages (those which the receiver identified as causing problems) and removes them 470 from the transmission queue—transferring them to a predetermined retry queue. In order to preserve once-and-once only semantics, this transfer is performed with syncpoint coordination and is atomic.

The sender node then takes 480 the messages remaining on the transmission queue one at a time for retransmission to the receiver node in a new batch, referring to the destination black list to identify 490 any messages having the same destinations as those which caused problems on the first attempt. Any messages that are identified as having destinations that are on the black list are transferred 490 to the retry queue and are not included in the batch which is then retransmitted 500. The retried batch consists only of messages that have destinations that are not on the sending node's back list.

In general, the receiver will now be able to store 510 all messages of the batch and the message transfer is committed 520,530.

If there remain problems associated with some of the messages within the batch, then the process of backing out the batch transfer and separating these messages and other messages having the same destinations prior to resend is repeated. However, the avoidance of sending messages with problematic destinations increases the probability that all of the remaining messages in a batch can be successfully stored, and the expectation for many systems in which the invention is implementable is that the retransmitted batch will be transferred successfully.

Some of the conditions which mean that messages cannot be stored successfully at the receiving node may be transient. For example, the queue on which a message should be stored might be full, but then an application program processes some of the messages on the queue and it ceases to be full. Secondly, there may be a temporary shortage of available disk space. Thirdly, the queue may be "PUT inhibited"—an administrator or other person or application having set the queue to avoid further messages being added to it. Periodically, as determined by administration-defined parameters, instead of sending a batch of messages from the sender node's transmission queue, the sender node sends 540 a batch taken from its retry queue. The administration-defined parameters preferably comprise a preset time period following the addition of a message to the retry queue, but can equally be a preset number of batches which should be taken from the transmission queue before a batch is taken from the retry queue, or any other suitable parameter. The process of taking messages from the retry queue for retransmission controls this batch to include no more than one message having each destination. The receiver communicates 560 to the sender a confirmation of whether messages within the batch of messages from the retry queue were successfully stored 550 at the receiver node. Since there is a likelihood that only some of the retried messages will be successfully transferred from the retry queue, the process controlling retransmission from the retry queue responds to a confirmation of successful storage of any message by attempting to resend 580 all messages in its retry queue which have the same destination.

Once the sending node has successfully sent all of the messages on its retry queue which have the same destination, that destination is erased 620 from the destination black list.

The present invention is preferably implemented so as to identify and isolate 470,490 from a batch of messages any messages which could not be successfully stored in a named destination queue or transmission queue at a receiver node. In this context, storing of messages in a dead-letter queue does not constitute "successful" storage at the receiver node as the message has not reached the intended target queue and so invokes a backout. This does not mean that storage in a dead-letter queue of the receiver node is unacceptable but only that, in the preferred embodiment of the invention, messages invoke a backout and the steps of identification and exclusion of messages are performed when a message cannot be stored in the correct target queue. Messages are then only placed in a dead-letter queue after repeated failures to transfer them "successfully". It was noted above that "dead letter queues" may not be defined for all systems and even if defined will not always be available and so minimizing reliance on dead-letter queues is desirable. Furthermore, a system using dead letter queues requires additional message ordering correction facilities to be provided. Clearly, where the difficulty in storing messages at a receiver node is due to a general resource shortage, the dead-letter queue may be compromised to the same extent as other resources. A solution to these problems according to the embodiment of the invention is described in more detail below.

Following a rollback resulting from communication link or program failure, the sending MCA will try to re-establish a channel and resynchronize with the receiving MCA in order to resend the failed batch. Channel resynchronization is achieved during channel initialization. The sender MCA retrieves from its log the in-doubt LUWID, or message sequence number of the last message sent for which a confirmation was also sent. The receiving MCA will check his logged LUWIDs or sequence numbers to determine whether he is in sync with the sender. As a result of the comparison, he will confirm or reject the resynchronization request by returning an appropriate Status segment, containing the LUWID or sequence number of the last successfully committed message or batch of messages at his end. If this value matches the sender's, the sender may commit the previously sent messages, and commence sending the next one. If the receiver's value matches the previous LUWID or sequence number, the sender rolls back and resends the previous message or batch.

The MCAs thus use a syncpoint manager to control each batch as a logical unit of work. The unit of work including the MQGET of the sender message queue manager and the unit of work including the MQPUT of the receiver message queue manager are logically linked in that both are held in doubt until the receiver is ready to commit, messages being committed at the receiving end before deleting them at the sending end using a single-phase commit protocol. Two phase commit is not required as the sender acts as a commit coordinator. Any system failure that occurs before the end of the batch, either at the sender or receiver, may require the unit of work to be backed out during a resynchronization phase. This single-phase commit using logical linkage of units of work on different systems avoids the problem of a two-phase commit needing to synchronize (lock) all participating resources in a distributed unit of work. According to this commit processing, resource managers do not actually have to synchronize with each other. A limited period of inconsistency between resources as viewed by applications is accepted, but final consistency is assured since atomic transaction processing is assured.

The destination black list is held as an in-memory table (i.e. in volatile storage). On restart after a system or program failure, it is rebuilt by browsing the retry queue and recording message destinations from the message headers. An alternative to this is to actually retrieve each message from the retry queue and to attempt to resend simultaneously with rebuilding the retry queue.

Some messages may never succeed in being stored successfully at the receiving node, for example if they were generated with an invalid destination address. To avoid such messages remaining in the retry queue indefinitely, a maximum retry count is used at the sender node after which the message is deemed undeliverable. Such an undeliverable message is then transferred to a dead letter queue (which in this case may be located either at the sender node or the receiver node—although to implement the latter requires the receiver node to be given confirmation of when to do this rather than reject the batch).

The embodiment of the invention described in detail involves the receiver node reporting back to the sender all transfer errors and identifying the messages involved. An alternative which is within the scope of the present invention is for the receiving node to report only those transfer errors which it considers to be "transient" to the sending node, and to transfer errors which it considers to be "permanent" (for example, an invalid destination address) to the receiver node's dead letter queue. What conditions are to be identified as "transient" and "permanent" can be defined by a system administrator. A simple implementation defines the following three easily recognizable conditions as transient: a queue to which one of the messages of the batch should be put is full; or a queue is PUT-inhibited; or disk storage is full. All other conditions are defined as "permanent" and do not cause a problem-message identification to be communicated to the sender node.

In such an embodiment of the invention, the method steps of identifying problematic messages within a batch and placing them in a retry queue for retransmission separately from the batch are preferably performed before any attempt is made to place messages in a dead letter queue. A dead letter queue (which may be located at either the sender node or the receiver node) is then only used for messages determined to be undeliverable after use of the retry queue. This reduction of reliance on dead letter queues is particularly useful when message ordering is important (as it is in many systems), as it is difficult to re-order messages in correct sequence when a dead letter queue is used. It is generally desirable to optimize the message transfer method for the situations where there are no message transfer errors or very few, in view of the very low incidence of such errors.

The embodiments of the invention described above in detail include the steps of separating identified rejection-causing messages from the batch of messages on the sender node's transmission queue, by placing those identified messages and other messages having the same addresses into a special retry queue. An alternative embodiment of the invention does not transfer messages in this way but maintains the identified messages on the transmission queue. According to such an embodiment, the transmission queue is browsed with reference to the message black list and messages having identified problematic destinations are bypassed (i.e. left on the transmission queue) when retrieving messages for retry of the batch transfer.

The embodiments of the invention described above use identification of final message destinations to exclude from a resent batch messages which are identified as causing problems and messages which have the same ultimate destinations. Such embodiments are most easily implemented in "adaptive message routing" systems in which a sender node has information concerning the final destination of a message and determines, from this information and network configuration information, the next adjacent node to which the message should be sent. It is also known in messaging systems to employ "source routing", in which a first sender node determines a complete route for message communication between network nodes and identifies each of the network nodes which are to be part of that route. In such source routing systems, for example, it is possible to distinguish between messages by reference to the next adjacent nodes to which they are to be sent. In such cases, an identification of message "destination" and a "destination black list" may refer to the next adjacent node, such that an implementation of the present invention excludes from a resent batch of messages all messages having the same next adjacent node along their predetermined communication route.

As an alternative to the embodiments of the invention described above, storing of problem messages in a "dead-letter queue" on the receiver node may be considered a successful storage such that there is no need to back out the batch as long as all messages within the batch are stored at the receiver. According to this embodiment of the invention, the method steps of identifying messages and their destinations and excluding messages from a new batch are only performed when messages which cannot be stored to the named target queues also cannot be stored in a dead-letter queue.

As mentioned above, the destination black list of each sender system can be held in an in-memory table. Alternatively, the black lists can be stored in non-volatile storage (e.g. disk storage) so that it need not be recreated at restart of the system. In this case, if message ordering is a system requirement, the black list must be stored in non-volatile storage within the same unit of work as is used to transfer messages between the transmission queue and the retry queue.

While the embodiments of the invention described in detail above use batching of messages both when transferring messages from the transmission queue of the sender to the receiver node and when transferring messages from the problem-message queue, embodiments of the invention may implement a reduced maximum batch size when trying messages from the retry queue and this may be a batch size of one (i.e. individual transmission) to ensure that messages for which the reason for initial failure is transient may proceed as soon as possible even if other messages on the problem-message queue repeatedly fail.

The embodiments described above implement the invention within a software product adapted for installation on a particular type of computer for use with the corresponding computer operating system. The invention could equally be implemented as a feature of the operating system itself, as many features of a messaging system may be implemented within an operating system if desired. Alternatively, the invention may be implemented higher up the hierarchy of data processing system resources—in an application program which provides messaging functions. The invention may also be implemented in communications controlling software or hardware of a packet switching communications network.

We claim:

1. A method of message transfer between nodes of a communication network wherein messages transferred within a batch of messages from a sender node to a receiver node can have different ultimate destinations, and wherein either all messages within the batch are stored at the receiver node or the whole batch transfer is rejected and retained in storage at the sender node without being stored at the receiver node, the method including:

responsive to rejection of a batch following failure to store one or more of the messages of the batch at the receiver node, identifying which message or messages within the batch caused the rejection; and retrying transfer of a batch of messages with said identified messages excluded from the retried batch.

2. A method according to claim 1, including the step of recording at the sender node the destinations of the identified messages, said retried batch excluding said identified messages and other messages having said recorded destinations.

3. A method according to claim 2, including transferring said identified messages and other messages having said recorded destinations from a first message storage facility at the sender node to a problem-message storage facility at the sender node for subsequent retry of transfer of said excluded messages from the problem-message storage facility separately from said retry of the batch transfer from said first message storage facility.

4. A method according to claim 3, including the steps of incrementing a retry counter for each retry of message transfer from the problem-message storage facility, and repeating retry from the problem-message storage facility and incrementing of said retry counter until either all messages from the problem-message storage facility have been successfully stored at the receiver node or a preset maximum retry count is reached.

5. A method according to claim 1, wherein the sender node selects messages for inclusion in the batch which is to be retried without limiting only to messages which were included in the rejected batch.

6. A method according to claim 1, wherein said identification step includes the receiver node identifying which messages caused the rejection and communicating to the sender node an identification of said identified messages, the sender node then selecting said identified messages to exclude them from the retry batch.

7. A method according to claim 6, wherein said receiver node determines which of said identified messages cannot be stored at said receiver node due to predefined transient conditions and then communicates to the sender node an identification of those messages which cannot be stored due to said transient conditions.

8. A method according to claim 1, including:

maintaining at the sender node a record of the destinations of all messages to be transferred;

responsive to rejection of a batch message transfer following failure to store one or more of the messages of the batch at the receiver node, identifying at the receiver node which message or messages within the batch caused the rejection;

sending an identification to the sender of said rejection-causing messages;

identifying at the sender node messages having approved destinations which are the destinations of messages within said rejected batch other than the destinations of said identified rejection-causing messages;

selecting at the sender node for inclusion in a new batch only messages having said approved destinations.

9. A method according to claim 1, wherein the storing of all of the messages of a batch at the receiver node comprises a message receiver process at said receiver node storing all messages within the received batch to message queues at said receiver node for subsequent retrieval either for processing or onward transmission, the transfer of the batch being rejected if not all of the messages within the batch can be stored in said message queues at the receiver node.

10. A message communication system supporting message transfer to and from nodes of a communications network of which said system is a first node, wherein messages sent within a batch from said first node to a receiver node may have different ultimate destinations, and wherein either all messages within the batch are stored at said receiver node or the batch transfer operation is rejected and backed out without any messages of the batch being stored at the receiver node, the message communication system including:

means, responsive to a communication from the receiver node indicating that a batch transfer is rejected and identifying which messages within the batch caused the rejection, for excluding said identified messages from a batch of messages to be transferred.

11. A system according to claim 10, including means for maintaining a list of destinations of messages sent in a batch from said first node to another network node, means responsive to said communication identifying messages which caused rejection of the batch for identifying the destinations of rejection-causing messages, and means for excluding from a batch of messages to be transferred from said first node said identified messages and other messages having said identified destinations.

12. A system according to claim 10, having means for sending messages in a batch from a first message storage facility of said system to message storage facilities at a receiver node, said system including means for transferring said identified messages to a problem-message storage facility at the first node from which said identified messages can be subsequently retrieved for transfer to the receiver node separately from batch transfer of messages from the first message storage facility.

13. A system according to claim 12, including:

means for incrementing a retry counter when said identified messages are retrieved from said problem message storage facility for transfer to the receiver node; and means for transferring messages from said problem-message storage facility to a dead-letter queue if a predefined maximum retry count is reached before all of said messages of said problem-message storage facility are successfully transferred and stored at said receiver node.

14. A system according to claim 10, including means at said first node for receiving batches of messages from sender nodes of a communications network and for rejecting transfer of a batch on failure to store one or more messages of the batch at said first node, said system including means for communicating to a sender node an indication that a batch transfer is rejected and an identification of the message or messages which could not be stored.

* * * * *